United States Patent [19]

Benuzzi, Piergiorgio

[11] Patent Number: 4,970,927

[45] Date of Patent: Nov. 20, 1990

[54] METHOD AND APPARATUS FOR THE CUTTING OF PANELS OR PACKS OF PANELS BY THE USE OF A SINGLE DISC-SAW

[75] Inventor: Benuzzi, Piergiorgio, Bologna, Italy

[73] Assignee: Giben Impianti S.p.A., Bologna, Italy

[21] Appl. No.: 248,668

[22] Filed: Sep. 26, 1988

[30] Foreign Application Priority Data

Sep. 24, 1987 [IT] Italy .................. 12542 A/87

[51] Int. Cl.$^5$ .................. B26D 3/06; B27B 33/00
[52] U.S. Cl. .................. 83/875; 83/699;
83/862; 144/3 R; 144/136 R; 144/238;
144/368; 144/371
[58] Field of Search .................. 83/887, 886, 862, 863,
83/699, 700, 644, 647.5, 875; 30/388; 144/3 R,
136 R, 367, 368, 371, 238, 239

[56] References Cited

U.S. PATENT DOCUMENTS

| | | | |
|---|---|---|---|
| 716,094 | 12/1902 | Peoples | 144/238 |
| 1,709,649 | 4/1929 | Adamson | 144/238 |
| 1,833,203 | 11/1931 | Buckley | 144/238 |
| 2,547,418 | 4/1951 | Spector | 144/238 |
| 3,664,021 | 5/1972 | Sawyer | 83/647.5 |
| 4,058,150 | 11/1977 | Pennington | 83/862 |
| 4,706,535 | 11/1987 | Ducharme | 83/863 |

Primary Examiner—Douglas D. Watts
Assistant Examiner—Rinaldi Rada
Attorney, Agent, or Firm—Pollock, Vande Sande & Priddy

[57] ABSTRACT

The hub (3) of the circular or disc-saw is supported, at the end adjacent to the saw, by at least one swingable radial bearing (6), while at the opposite end, driven for rotation by the pulley (28), the hub is supported by a servo-control (10-12) by which the axis of the hub can be maintained in line with the axis of rotation or said axes can be spaced apart angularly by rotation about a common point thereof, whereby the teeth of the saw will have a composite rotational movement and symmetrical side oscillation, with a frequency proportional to the rotational speed of the saw and with an amplitude proportional to the spacing of the axes and to the radius of the saw. The saw is used to score the panels which are subsequently cut through by the saw while being driven only in rotation.

1 Claim, 3 Drawing Sheets

METHOD AND APPARATUS FOR THE CUTTING OF PANELS OR PACKS OF PANELS BY THE USE OF A SINGLE DISC-SAW

FIELD OF THE INVENTION

The invention relates to a method and an apparatus for effecting a cut with prior score, i.e., a precision or neat cut, into panels or packs of panels of wood and/or other material by using only one disc-saw.

BACKGROUND OF THE INVENTION

The known technique teaches how to use only one disc-saw to cut panels by effecting first a score with partial cut into said panels and during a successive stroke of the carriage, the cut proper throughout said panels. Such a technique is described, for example, in applicant's Italian Patent Application No. 12532 A/85 to which broad reference is made herein. Applicant's further Italian Patent Application No. 12601 A/86 discloses cutting equipment adapted to carry out a differentiated-width cut by using two disc-saws having equal characteristics, arranged side by side, on one and the same shaft and driven in rotation by one and the same drive means, and provided with a servo-control by means of which the spacing of the two disc-saws can be changed automatically. By taking advantage of this feature, the saws are to score the material to be cut and are then approached again through a self-centering movement to effect the cut proper throughout the panels. During the execution of the cut, the teeth of the cutting equipment do not interfere with the scored portions of the panels and, therefore, do not cause the undesired formation of splinters. The solution has proved operatively satisfactory, but is of somewhat complicated construction when compared with the solution according to the present invention, which permits the same objectives to be achieved by using one single disc-saw having normal characteristics.

SUMMARY OF THE INVENTION

According to the invention, the disc-saw is mounted so as to be swingable about a point on its axis with a sufficiently high frequency, and so that the teeth of said saw will travel a sinusoidal orbit, with a reciprocating horizontal displacement of such an amplitude as to effect a scored groove whose width is greater than the width of said teeth.

According to one embodiment of the invention, the hub of the disc-saw is rotatably supported, at the end close to the saw, by a swingable radial bearing, while at the other end said hub is supported by means comprising a servo-control, and whereby the axis of the hub can be maintained perfectly in line with the axis of rotation or can be angularly spaced from said axis of rotation, so that every tooth of the saw makes a complete oscillation in the traverse direction during each complete revolution of said saw. The amplitude of said oscillation depends upon the spacing apart or offset of said hub of the saw and upon the radius of said saw.

BRIEF DESCRIPTION OF THE DRAWINGS

Further characteristics of the invention and the advantages resulting therefrom, will be more apparent from the following description of a preferred embodiment thereof, shown merely by way of example in the accompanying drawings, wherein.

DESCRIPTION OF PREFERRED EMBODIMENTS

Figure 1:
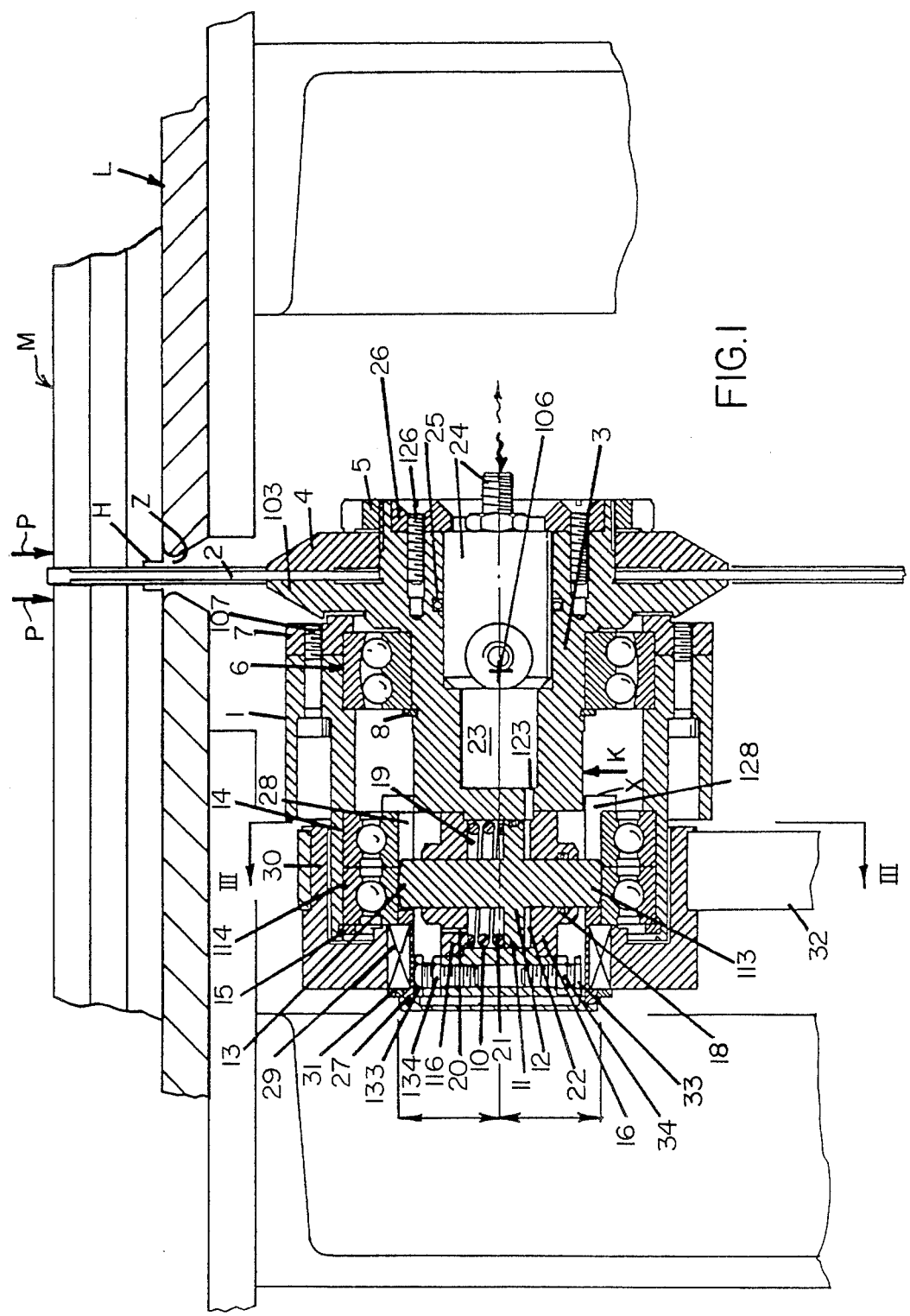
FIGS. 1 and 2 are sectional views of the apparatus of the invention on a plane containing the axis of rotation of the disc-saw, said saw being shown in the condition permitting its rotation and in the opposite condition permitting both its rotation and oscillation, respectively.

As shown in FIG. 1, the portion 1 of the carriage of the sawing machine mounting the disc-saw 2 is associated with the translational carriage so that it can be selectively raised and lowered to change the positioning level of said disc-saw, so that said saw can make the scoring cut and, successively, the through-cut of the material M disposed on the worktable L of the sawing machine and locked on the line of cut Z along which the saw is displaced, by means of a pressure means indicated by the arrows P.

The disc-saw 2, of conventional type, is supported by a hub 3 provided with a flange 103, with a counter-flange 4 and with a locking ring-nut 5. The hub 3 is rotatably supported by said portion 1, at the end thereof close to the saw 2, by means of a bearing 6 of the radial, swingable and sealed type. The center of oscillation of the bearing 6 lies on the axis of the hub 3 and is indicated at 106. However, it is to be understood that said center of oscillation 106 may be located outside of the imaginary center-plane of the bearing 6. The bearing 6 is locked in the body 1 and on the hub 3 by the flange 7 with screws 107 and by the spring-lock ring 8.

Figure 3:
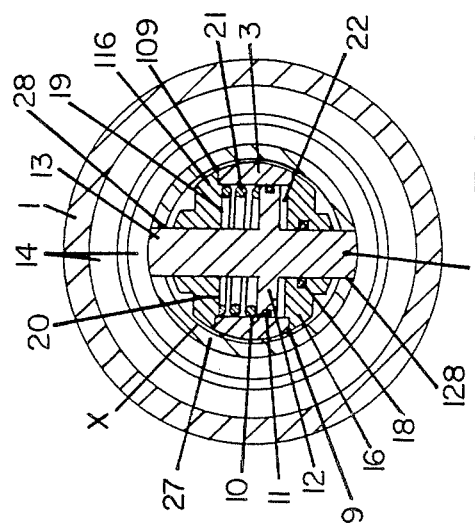
FIG. 3 is a sectional view on the line III—III of FIG. 1, showing some constructional details.

On the portion of the hub that is most distant from the saw 2 there are formed two flats 9, 109 (see FIG. 3) which are parallel to each other and to the axis of the hub 3, and are equally spaced from said axis. Perpendicularly to said flats, the hub 3 is formed with a round-section through-bore 10 the axis of which is exactly perpendicular to the axis of said hub 3. Mounted in the bore 10, so as to be axially slidable and to be laterally sealed by means of seals 11, is a piston 12 which is provided with oppositely-directed rods 13, 113, either integral therewith or secured thereto, whose rounded ends engage the inner side surface of one of the radial sealed bearings 14, 114 mounted in the body 1 co-axially to said bearing 6. Spring-lock ring 15 locks the bearings 14, 114 in place.

Figure 4:
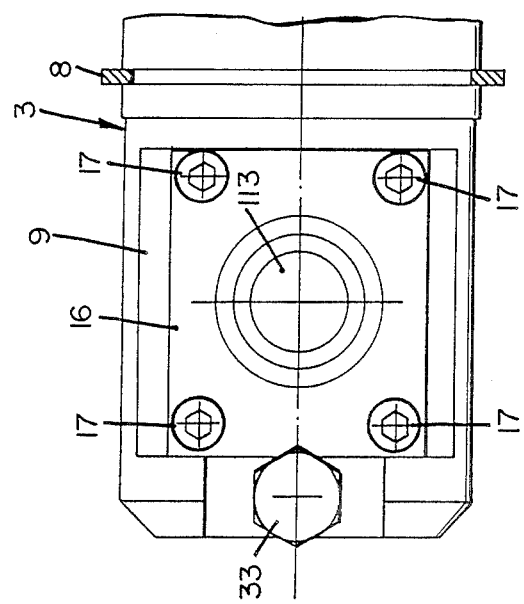
FIG. 4 shows some details of the saw-carrying hub, as seen in the direction of arrow K in FIG. 1.

The bore 10 is closed at the ends thereof by covers 16, 116 which are fixed by screws 17 (see also FIGS. 3 and 4) on said flats 9, 109 and are formed integral with enlarged portions which are traversed by said rods 13, 113 in an axially slidable manner.

The cover 16 is provided with a seal 18 for sealingly co-operating laterally with the rod 13, and the cover 116 is provided with a through-hole 20 whereby the internal chamber 19 is always in communication with the atmosphere.

Mounted in the chamber 19 is a cylindrical coil spring 21 of suitable characteristics acting on the piston 12 and cover 116 to urge the rod 13 to restract (see below).

The other internal chamber 22 of the cylinder-and-piston unit 10,12, however, is a sealed chamber and—through a conduit 23, 123 in the hub 3 and through a rotary joint 24 mounted axially on said hub 3—said chamber 22 may be connected alternately with a source of pressurized fluid or with a free discharge. Said joint 24 is embedded in the hub 3 with a sealing ring 25 and is locked on said hub by means of a flange 26 with screws 126.

The bearings 14,114 rotatably support with their inner race a bushing 27 having an internal flange and provided longitudinally with opposite slots 28, 128 receiving therethrough said rods 13, 113. Keyed on said bushing 27 by means of keys 29 is a pulley 30 which is locked axially by a spring-lock ring 31 and which, through a belt 32, is actuated by an electric motor associated with the carriage (not shown) and used for the normal rotation of the saw 2.

At the free end of the flattened portions 9, 109 of the hub 3, there are screwed perpendicularly screws 33, 133 with locking nuts 34, 134, which alternately abut against the inner side surface of the bushing 27, according to the following operational logic.

When the pressurized chamber 22 is relieved, the action of the spring 21 prevails and the screw 133 abuts against the bushing 27. In this condition, shown in FIG. 1, the axis of the hub 3 is perfectly in line with the axis of rotation of said hub and the saw will be used for actually cutting the material M. The rotation of the pulley is transmitted to the hub 3 through the bushing 27 and through the rods 13, 113 acting actually as keys co-operating with the slots 28, 128.

Figure 2:
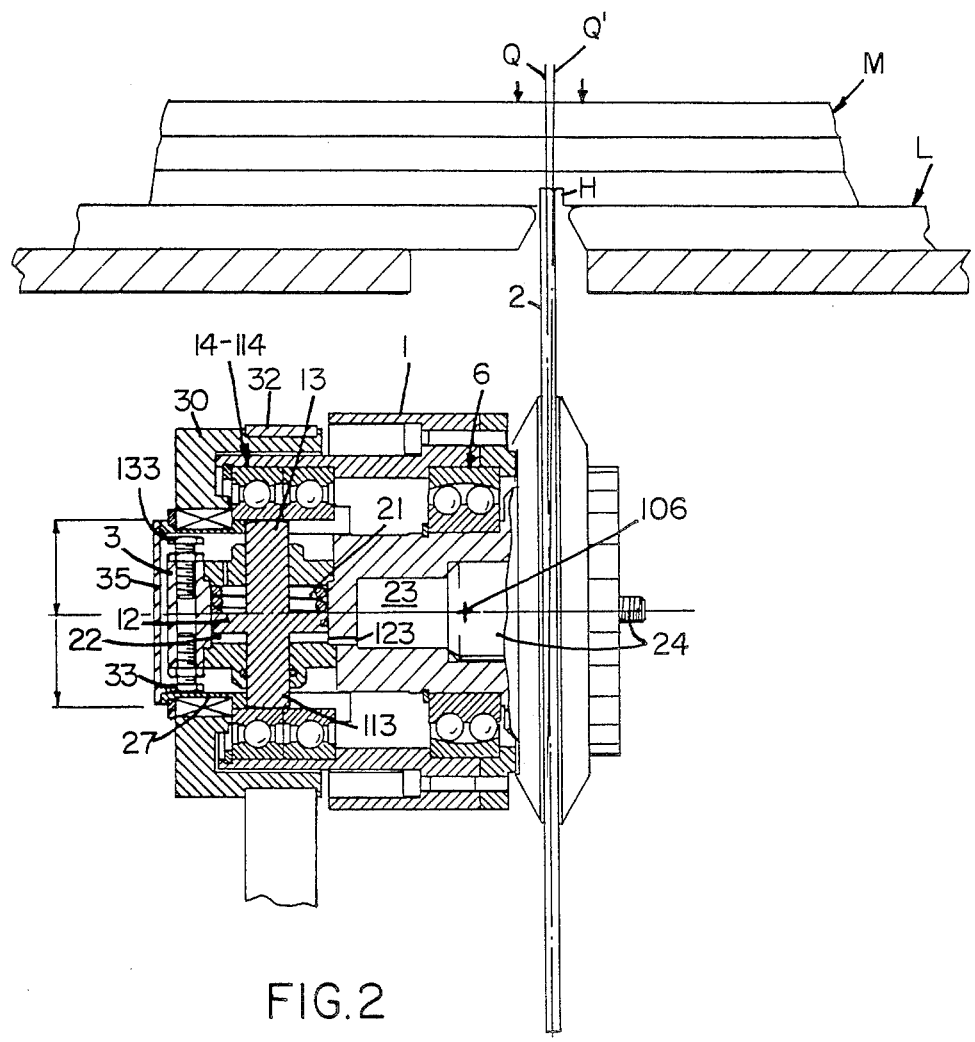

However, when pressurized fluid is admitted into the chamber 22 through the circuit 23-123-24, the action of the spring 21 is overcome thereby and the screw 33 will abut against the bushing 27. In this condition, the device is in the condition shown in FIG. 2. The hub 3 has effected a small rotation about the point of oscillation 106 of the bearing 6, facilitated by a small gap X between the inside diameter of pulley 30 and hub 3, and the distance D, which was previously equal to D', is now smaller (FIGS. 1 and 2). The saw 2 is moved to the position shown in solid lines in FIG. 2.

During the two different operating conditions of the saw, pulley 30 is always kept keyed to hub 3 through slots 28, 128 in bushing 27, and these slots are connected with the ends of stems 13, 113, that are in turn key-like connected to hub 3.

As a result, upon each rotation transmitted to the saw 2 through the drive system 30, 32, said saw effects a complete oscillation and moves from the position Q, to the position Q' and vice versa. The teeth of the saw travel sinusoidal orbit with a horizontal-symmetric displacement whose amplitude is proportional to the offset imparted to the hub 3 and the radius of the saw 2.

Since the peripheral speed of rotation of the saw is somewhat high, the frequency of oscillation of said saw is equally high. In one preferred embodiment, the oscillation frequency of saw 2 preferably is substantially equal to the rotational speed of the saw. Thus, for example, when the saw has a diameter of about 40 cm and rotates at a speed of 4000–4500 rpm, the frequency of the saw blade oscillation is 4000–4500 cycles per minute. In these conditions, the saw can be used as a scoring member to effect a scoring groove H in the material M as from FIG. 2, the width of said groove being suitably larger and symmetrical with respect to the width of the cut effected by said saw in the normal operating conditions as from FIG. 1. Said groove may be effected in the various portions of the material M which require this pre-treatment, for example, though not solely, as disclosed in the patent application referred to in the introductory part of this specification.

On completion of said scoring groove, the feed of pressurized fluid to the camber 22 is discontinued and the apparatus reverts automatically to the condition of FIG. 1, with the distances D and D' equal to each other. In these conditions, as stated above, the saw is used to effect the cut proper through the material M.

As shown in FIGS. 1 and 2, a cover 35 closes the front side of the bushing 25 to prevent the admission of dust, which might affect the adjustment of the limit-screws 33, 133.

Means other than those described may be used to offset the axis of the hub 3 from the axis of the bearing 14, 144. For example, it might be possible to eliminate the rotary joint 24 and to effect the feed therethrough, and also to eliminate the spring 21 and to use the oppositely-arranged rods 13, 113, or at least one of them, only as a key for connecting mechanically the hub 3 to the bushing 27. The hub 3 might protrude from the bushing 27 unprovided with the cover 35, and it might be rotatably supported by an eccentric or by a guide-and-slide unit supported, in turn, by the structure 1 through the intermediary of a servo-control, now static, which would permit the position of the hub 3 to be changed according to the logic disclosed above.

I claim:

1. Apparatus for the precision cutting of material by a single disc-saw, comprising means for supporting a hub (3) of said disc-saw (2) at a first end of said hub adjacent to said saw by at least one pivotable radial bearing (6), and means for supporting a second end of said hub receiving rotation of a pulley (30) and being operatively connected to a servo-control (10-12-13-113) enabling an axis of said hub to be perfectly aligned with an axis of rotation of said saw and permitting, on command, angular spacing of said axis of said hub from said axis of rotation, with rotation about a center of said bearing (6), whereby upon each rotation imparted to said disc-saw (2), teeth thereof perform a complete oscillation in a transverse direction, with an amplitude proportional to said spacing and to a radius of said disc-saw, and wherein said servo-control comprises a cylinder-and-piston unit (10, 12) with two oppositely-directed rods (13, 113), both of said rods being aligned normally to said axis of said hub and having rounded ends abutting against an inner race of at least one radial bearing (14, 114) which rotatably supports said pulley (30) which drives said hub in rotation by means of a bushing (27) coaxil with said hub and formed with longitudinal opposite slots (28, 128) tranversed by said rods, said cylinder-and-piston unit being of the single-acting type with an internal spring (21), said cylinder-and-piston unit being connected with a pressurized chamber (22) to a rotary joint (24) mounted axially at an end of said hub, said pressurized chamber being selectively connectible with a source of pressurized fluid, said hub being provided with adjustable screws (33, 133) paralled and adjacent to said rods, which screws alternately abut against an inner surface of said busing, whereby, when said cylinder-and-piston unit is at rest, said axis of said hub is aligned with said axis of rotation, and when said cylinder-and-piston unit is activated, said axis of said hub is spaced angularly from said axis of rotation, whereby said disc-saw will be moved in a path of composite movement of rotation and lateral oscillation to effect scoring cuts (H) in said material.

* * * * *